United States Patent
Abernathy et al.

(10) Patent No.: US 10,528,355 B2
(45) Date of Patent: Jan. 7, 2020

(54) HANDLING MOVE INSTRUCTIONS VIA REGISTER RENAMING OR WRITING TO A DIFFERENT PHYSICAL REGISTER USING CONTROL FLAGS

(71) Applicant: ARM LIMITED, Cambridge, MA (US)

(72) Inventors: Chris Abernathy, Austin, TX (US); Florent Begon, Antibes (FR)

(73) Assignee: ARM Limited, Cambridge (GB)

( * ) Notice: Subject to any disclaimer, the term of this patent is extended or adjusted under 35 U.S.C. 154(b) by 394 days.

(21) Appl. No.: 14/757,576

(22) Filed: Dec. 24, 2015

(65) Prior Publication Data

US 2017/0185410 A1 Jun. 29, 2017

(51) Int. Cl.
*G06F 9/38* (2018.01)
*G06F 9/30* (2018.01)

(52) U.S. Cl.
CPC .......... *G06F 9/384* (2013.01); *G06F 9/30032* (2013.01)

(58) Field of Classification Search
CPC .............................. G06F 9/30032; G06F 9/384
See application file for complete search history.

(56) References Cited

U.S. PATENT DOCUMENTS

| | | | |
|---|---|---|---|
| 6,505,293 B1 * | 1/2003 | Jourdan | G06F 9/30032 712/216 |
| 2011/0208918 A1 * | 8/2011 | Raikin | G06F 12/0862 711/137 |
| 2012/0265969 A1 * | 10/2012 | Alexander | G06F 9/384 712/220 |
| 2013/0275720 A1 * | 10/2013 | Keller | G06F 9/30032 712/205 |
| 2014/0068230 A1 * | 3/2014 | Madduri | G06F 9/30032 712/216 |
| 2014/0189324 A1 * | 7/2014 | Combs | G06F 9/384 712/225 |
| 2016/0026463 A1 * | 1/2016 | Sundar | G06F 9/30032 712/208 |

OTHER PUBLICATIONS

UK Combined Search and Examination Report dated Oct. 18, 2016 in GB 1608221.6, 5 pages.

* cited by examiner

*Primary Examiner* — Jacob Petranek
(74) *Attorney, Agent, or Firm* — Nixon & Vanderhye P.C.

(57) ABSTRACT

An apparatus has processing circuitry, register rename circuitry and control circuitry which selects one of first and second move handling techniques for handling a move instruction specifying a source logical register and a destination logical register. In the first technique, the register rename circuitry maps the destination logical register of the move to the same physical register as the source logical register. In the second technique, the processing circuitry writes a data value read from a physical register corresponding to the source logical register to a different physical register corresponding to the destination local register. The second technique is selected when the move instruction specifies the same source logical register as one of the source and destination logical registers as an earlier move instruction handled according to the first technique, and the register mapping used for that register when handling the earlier move instruction is still current.

20 Claims, 8 Drawing Sheets

HANDLING MOVE INSTRUCTIONS VIA REGISTER RENAMING OR WRITING TO A DIFFERENT PHYSICAL REGISTER USING CONTROL FLAGS

BACKGROUND

Technical Field

The present technique relates to the field of data processing.

Technical Background

A data processing apparatus may support register renaming in which logical registers specified by instructions are mapped to physical registers provided in hardware. This can be useful for example to improve performance by eliminating dependencies between successive instructions writing to the same logical register by mapping their destination logical registers to different physical registers. This is particularly useful in an out-of-order processor in which eliminating data dependency hazards between instructions using register renaming increases the freedom to change the order in which instructions are executed to improve performance.

SUMMARY

At least some examples provide an apparatus comprising:
processing circuitry to perform data processing in response to instructions;
register rename circuitry to map logical registers specified by the instructions to physical registers provided in hardware;
control circuitry to select one of a first move handling technique and a second move handling technique for handling a move instruction specifying a source logical register and a destination logical register; wherein:
in the first move handling technique, in response to the move instruction the register rename circuitry is configured to map the destination logical register to the same physical register as the source logical register;
in the second move handling technique, in response to the move instruction the processing circuitry is configured to write a data value read from a physical register corresponding to the source logical register to a different physical register corresponding to the destination logical register; and
the control circuitry is configured to select the second move handling technique when the source logical register of the move instruction is the same as one of the source and destination logical registers of an earlier move instruction handled according to the first move handling technique and a current register mapping for said one of the source and destination logical registers is the same as the register mapping used for said one of the source and destination logical registers when handling said earlier move instruction.

At least some examples provide an apparatus comprising:
means for performing data processing in response to instructions;
means for mapping logical registers specified by the instructions to physical registers provided in hardware; and
means for selecting one of a first move handling technique and a second move handling technique for handling a move instruction specifying a source logical register and a destination logical register; wherein:
in the first move handling technique, in response to the move instruction the means for mapping is configured to map the destination logical register to the same physical register as the source logical register;
in the second move handling technique, in response to the move instruction the means for performing data processing is configured to write a data value read from a physical register corresponding to the source logical register to a different physical register corresponding to the destination logical register; and
the means for selecting is configured to select the second move handling technique when the source logical register of the move instruction is the same as one of the source and destination logical registers of an earlier move instruction handled according to the first move handling technique and a current register mapping for said one of the source and destination logical registers is the same as the register mapping used for said one of the source and destination logical registers when handling said earlier move instruction.

At least some examples provide a data processing method comprising:
selecting one of a first move handling technique and a second move handling technique for handling a move instruction specifying a source logical register and a destination logical register;
when the first move handling technique is selected, mapping the destination logical register to the same physical register as the source logical register; and
when the second move handling technique is selected, reading a data value from a physical register corresponding to the source logical register and writing the data value to a different physical register corresponding to the destination logical register;
wherein the second move handling technique is selected when the source logical register of the move instruction is the same as one of the source and destination logical registers of an earlier move instruction handled according to the first move handling technique and a current register mapping for said one of the source and destination logical registers is the same as the register mapping used for said one of the source and destination logical registers when handling said earlier move instruction.

Further aspects, features and advantages of the present technique will be apparent from the following description of examples, which is to be read in conjunction with the accompanying drawings.

DESCRIPTION OF EXAMPLES

Some specific examples will be described below. It will be appreciated that the invention is not limited to these exact examples.

A move instruction may be provided specifying a source logical register and a destination logical register. For systems not supporting register renaming, in response to the move instruction, processing circuitry would read a data value from one register and write the data value to a different register. However, when register renaming is supported, the move instruction can be handled faster at the rename stage by simply remapping the destination logical register of the move instruction to the same physical register that is currently mapped to the source logical register. Handling the move instruction using the register rename circuitry can help to improve performance, firstly by eliminating the need to actually dispatch the move instruction to the processing circuitry, freeing up processing slots for other instructions, and also because subsequent instructions which read the destination logical register of the move instruction effectively become dependent on an older instruction which writes to the source logical register of the move instruction, so the subsequent instructions do not need to wait as long for their operands to become available, thereby improving performance.

Since a given move instruction can typically be handled faster at the rename stage than if it is actually processed by the processing circuitry, one would expect it would always be desirable to handle the move instruction using the renaming technique. However, some complications may arise because when a move instruction is handled by remapping the destination logical register to the same physical register as the source logical register at the rename circuitry, this results in multiple logical registers all being mapped to the same physical register. This can make it harder to determine when a given physical register is no longer required by any pending instructions and can be reallocated to a different logical register. A given program may include a chain of move instructions which each depend on the result of the previous move instruction. For example, one move instruction may move data from logical register A to logical register B, followed by another move instruction to move data from logical register B to logical register C, followed by another move instruction to move data from logical register C to logical register D, and so on. If each of these move instructions in the chain is handled using the renaming technique, this can result in many logical registers all being mapped to the same physical register and this may make physical register deallocation complex. An approach for addressing this is to provide a number of counters per physical register which are incremented every time a logical register is mapped to that physical register and decremented when that mapping is no longer required. When the counter reaches zero the physical register may then be reallocated to a different logical register. However, this is a relatively expensive solution, because a typical high-end out-of-order processing pipeline may have as many as 160-180 physical registers, and providing each of these with its own multi-bit counter can result in a large amount of additional state data needing to be stored, in addition to providing circuitry per physical register to increment or decrement the counter and compare the counter with zero to determine when the physical register can be reallocated.

Instead, an apparatus may be provided with control circuitry to select one of a first move handling technique and a second move handling technique for handling a move instruction. In the first move handling technique, in response to the move instruction the register rename circuitry maps the destination logical register to the same physical register as the source logical register. In the second move handling technique, in response to the move instruction the processing circuitry writes a data value read from a physical register corresponding to the source logical register to a different physical register corresponding to the destination logical register. The control circuitry may select the second move handling technique when the source logical register of the move instruction is the same as one of the source and destination logical registers of an earlier move instruction which was handled according to the first move handling technique, and the register mapping used for that one of the source and destination logical registers when handling the earlier move instruction is still current.

One would expect that selecting the second move handling technique on some occasions would harm performance because the second move handling technique may generally be slower than the first. However, in practice, the inventors observed that when there is a chain of dependent move instructions, the second move instruction in the chain and any subsequent move instructions in the chain are frequently not on the critical path. Most of the moves observed on the critical path of processing (the path which limits performance) do not have a subsequent move that depends on it. Therefore, it has been found that much of the performance benefit of handling move instructions using the first move handling technique can be achieved if the first move instruction of a chain is handled according to the first move handling technique, but subsequent chained moves are handled according to the second move handling technique. Hence, by selecting the second move handling technique when the source logical register of the move instruction is the same as one of the source or destination logical registers of an earlier move instruction handled according to the first move handling technique and the register mapping for that one of the source and destination logical registers is still current, then this avoids the need for complex circuitry for tracking large numbers of logical registers mapped to the same physical register, to save circuit area and power consumption, but counterintuitively this does not result in a significant loss of performance.

In some examples, the first move handling technique may be selected in situations other than the condition mentioned above when the source of the move instruction matches the source or destination of the earlier move instruction and the current register mapping for that one of the source or destination of the earlier move instruction is still current. On the other hand, it is also possible to select the second move handling technique in some situations other than the condition mentioned above.

Note that, at the point of determining how to handle a given move instruction, when the current register mapping for the source or destination logical register of the earlier move instruction is still the same as the register mapping used when handling the earlier move instruction, this does not necessarily imply that there has been no change to the register mapping for that logical register since handling the earlier move instruction. Although often this will be the case, in systems supporting speculative renaming of instructions, it is possible that another instruction may be speculatively renamed to change the register mapping used for the relevant logical register. If it is subsequently detected that the other instruction should not be executed (e.g. a branch may have been mispredicted), the pipeline may be flushed and the register mapping for that logical register may be restored to the earlier register mapping which it had when handling the earlier move instruction.

In the first move handling technique, in response to the move instruction the register rename circuitry maps the destination logical register to the same physical register as the source logical register. The control circuitry may suppress dispatching of the move instruction to the processing circuitry when the first move handling technique is used.

On the other hand, for the second move handling technique, the register rename circuitry may map the destination logical register of the move instruction to a second physical register which is different from the first physical register currently mapped to the source logical register. The move may then be dispatched and executed by the processing circuitry, to read the data value from the first physical register and write that data value to the second physical register.

One way of tracking whether a given logical register was the source or destination of an earlier move instruction for which the register mapping used when handling the earlier move is still current is to provide a number of control flags which each correspond to one of the logical registers. For example, each control flag may be stored in a rename table along with the corresponding logical register to physical register mapping. The control circuitry may select between the first and second move handling techniques based on the control flag corresponding to the source logical register of a new move instruction to be handled. Each control flag can take a first value and a second value. The control circuitry sets the control flags corresponding to both the source and destination logical registers of a move instruction to a first value when that move instruction is handled using the first move handling technique. When the register rename circuitry remaps a given logical register to a different physical register for an instruction other than a move instruction handled using the first move handling technique, the control flag is set to a second value. When a move instruction is encountered, the control circuitry checks the control flag which corresponds to the source logical register of the move instruction. When the control flag has the first value, the second move handling technique is selected for that move instruction. When the control flag has the second value, the first move handling technique is selected. The first value and the second value may correspond to 1 and 0 respectively, or vice versa.

This approach limits the maximum number of logical registers which can be mapped to the same physical register to two, so that the overhead of controlling physical register reallocation can be reduced, because providing a control flag per logical register is more area efficient than the alternative technique discussed above of providing a multi-bit counter and associated control logic per physical register, since typically there are many fewer logical registers in the architecture supported by the processor than there are physical registers provided in hardware.

The apparatus may have register reserving circuitry to control which physical registers are available to be reallocated to a different logical register by the register rename circuitry. In some systems, the register reserving circuitry may be considered to be separate from the register rename circuitry, while in other examples the register reserving circuitry could be part of the register rename circuitry itself. In general, the register reserving circuitry may reserve physical registers to prevent them being reallocated if a subsequent instruction could potentially require the value stored in the physical register (either because the value in the physical register represents the current architectural state required by the subsequent instruction, or because the physical register holds previous architectural state which may need to be restored if there is a mis-speculation).

There are many ways of controlling physical register reallocation—some approaches may allow physical registers to be reclaimed sooner to improve performance, while other approaches may be more conservative but require less complex control circuitry to save area and power. In general, the register reserving circuitry may determine, for each register mapping between a logical register and a physical register, whether a reallocation condition for reallocating the physical register is satisfied. For example, the reallocation condition may be based on observing subsequent instructions which read or write the corresponding logical register. In a first example, the reallocation condition could be satisfied when a younger instruction which writes to the same logical register has been committed, and there are no pending instructions still to be executed which are older than the younger instruction. In a second example, the register reserving circuitry may track the logical registers to be read by pending instructions, and determine that the reallocation condition is satisfied for a given logical-to-physical register mapping when there are no more pending instructions still to be executed which correspond to the same logical register and a younger instruction specifying the same logical register as a destination register is guaranteed to commit. The second approach may improve performance compared to the first, since a given physical register can be made available for reallocation faster (if there are no remaining instructions which actually read the physically register, there is no need to wait for the younger instruction to actually commit). On the other hand, the first approach may be more efficient to implement in circuitry because the reallocation condition can be evaluated simply based on the relative age of the pending instructions, and does not require the registers read by each instruction to be tracked. Hence, the particular reallocation condition used may be a trade off between area and performance.

Regardless of what type of reallocation condition is used, following handling of a move instruction according to the first move handling technique, the register reserving circuitry may prevent the physical register mapped to the source and destination logical registers of the move becoming available for reallocation and until the reallocation condition is satisfied for both the source logical register and the destination logical register of the move. By selecting between the first and second move handling techniques as discussed above, freeing of a given physical register only requires tracking of the reallocation condition for two different logical registers, rather than a chain of three or more registers. This makes the register reserving circuitry more efficient to implement in terms of area and power consumption.

For example, one way of tracking whether both the source and destination logical register mappings satisfy the reallocation condition may be to maintain register state information for each physical register indicating one of multiple register states for each physical register. The register states may include at least an available state, a reserved state and an almost available state. In some systems there may be more than these three states (e.g. if there are other situations in which a physical register may need to be protected from reallocation).

When a given logical register is mapped to a new physical register, the new physical register may be selected from among those physical registers for which the corresponding register state information indicates the available state. Physical registers in the reserved state or almost available state are not eligible for selection as the new physical register. When a new physical register is selected and mapped to a given logical register, the corresponding register state information for the selected physical register is updated to indicate the reserved state. This prevents that physical register being mapped to a different logical register until it returns to the available state.

Following handling of a move instruction according to the first move handling technique, the given physical register mapped to both the source and destination logical registers of the move is initially in the reserved state (the physical register would already have transitioned to the reserved state when it was previously allocated to the source logical register of the move in response to an earlier instruction). When the reallocation condition is determined to be satisfied for the register mapping between the given physical register and either one of the source and destination logical registers, and the register state information for the given physical register indicates the reserved state, the register state information for the given physical register is updated to indicate the almost available state, so the physical register does not yet become available for reallocation (because the other of the source and destination logical registers of the move does not yet satisfy the reallocation condition). When the reallocation condition is detected to be satisfied for the register mapping between one of the source and destination logical registers and the given physical register, and the register state information for the given physical register indicates the almost available state, then the register state information is updated for that given physical register to indicate the available state. At this point the physical register once more becomes available for remapping to a different logical register. Therefore, both the source and destination register mappings for the move instruction handled according to the first move handling technique need to satisfy the reallocation condition before the corresponding physical register can be reallocated.

In some systems, the register rename circuitry may use a single rename table to track register mappings between logical registers and physical registers.

However, in other examples it can be useful to divide the rename table into a speculative rename table for identifying register mappings updated in response to speculatively renamed instructions, and an architectural rename table to identify register mappings updated in response to committed instructions. This can be useful for supporting speculative execution of instructions before it may be known whether those instructions should actually be executed. The speculative rename table can be updated speculatively (e.g. at dispatch time) and if the speculation is correct then the register mappings in the speculative rename table are valid. The architectural rename table can be updated once the instructions are committed and this represents the last known register mappings for instructions which are guaranteed to be executed correctly. If there is a mis-speculation (e.g. a branch misprediction or incorrect data prefetching), the architectural rename table can be used to restore previous register mappings to the speculative rename table to enable processing to be resumed from a previous point before the mis-speculation occurred.

In such a system, the control circuitry may select whether to use the first or second move handling technique based on the speculative rename table, while the register reserving circuitry may control whether physical registers can be reallocated based on the architectural rename table. This ensures that physical registers are not reallocated if they could still be required when a mapping from the architectural rename table is restored to the speculative rename table following a mis-speculation. More particularly, the control circuitry may select the second move handling technique when the source logical register of a move instruction is the same as one of the source and destination logical registers of an earlier move handled according to the first move handling technique, and a current register mapping in the speculative rename table for that one of the source and destination logical registers of the earlier move is the same as the register mapping used when handling that earlier move instruction. The register reserving circuitry may prevent the physical register mapped to the source and destination logical registers of a given move becoming available for reallocation until register mappings for both the source and destination registers of the move have been overwritten in the architectural rename table.

In addition to the speculative and architectural rename tables, a transfer buffer may be provided to store one or more register mapping entries which specify register mappings which have been updated in the speculative rename table but are still to be updated in the architectural rename table when the corresponding instructions are committed. The transfer buffer can make updating of the architectural rename table simpler to implement in circuitry and also has the benefit that if there is a flush and the mappings from the architectural rename table are restored to the speculative rename table, some register mappings from the transfer buffer can be used to rebuild the speculative rename table up to the point at which the flush event occurred.

Each entry of the speculative rename table, the transfer buffer, and the architectural rename table may have a corresponding control flag which indicates whether the corresponding register mapping corresponds to a source or destination logical register of a move handled according to the first move handling technique. These control flags can be updated in the speculative rename table and transfer buffer using the technique discussed above of setting the control flags to first and second values. When an entry from the transfer buffer is written to the architectural rename table upon committing a corresponding instruction, the corresponding control flag may also be written to the architectural rename table so that the register reserving circuitry can determine from the architectural rename table which entries require transitions from the reserved state to the available state via the almost available state, and which entries can transition direct to the available state if they do not relate to one of the move instructions handled according to the first move handling technique.

In some cases the control circuitry discussed above for selecting how to handle a given move instruction may be separate from the rename circuitry itself. For example, an instruction decoder may have access to the rename table and use this to tag move instructions as instructions to be handled according to the first move handling technique or the second move handling technique, and then the register rename circuitry may simply read the tag to determine whether it should perform the move itself using the first technique or dispatch the instruction to the processing circuitry for handling using the second technique.

However, in other examples, the control circuitry may be the register rename circuitry itself. It may be simpler for the rename circuitry to determine how to handle a given move instruction since this it may control the rename table which may be used to determine whether the register mapping for an earlier move is still current.

Figure 1:
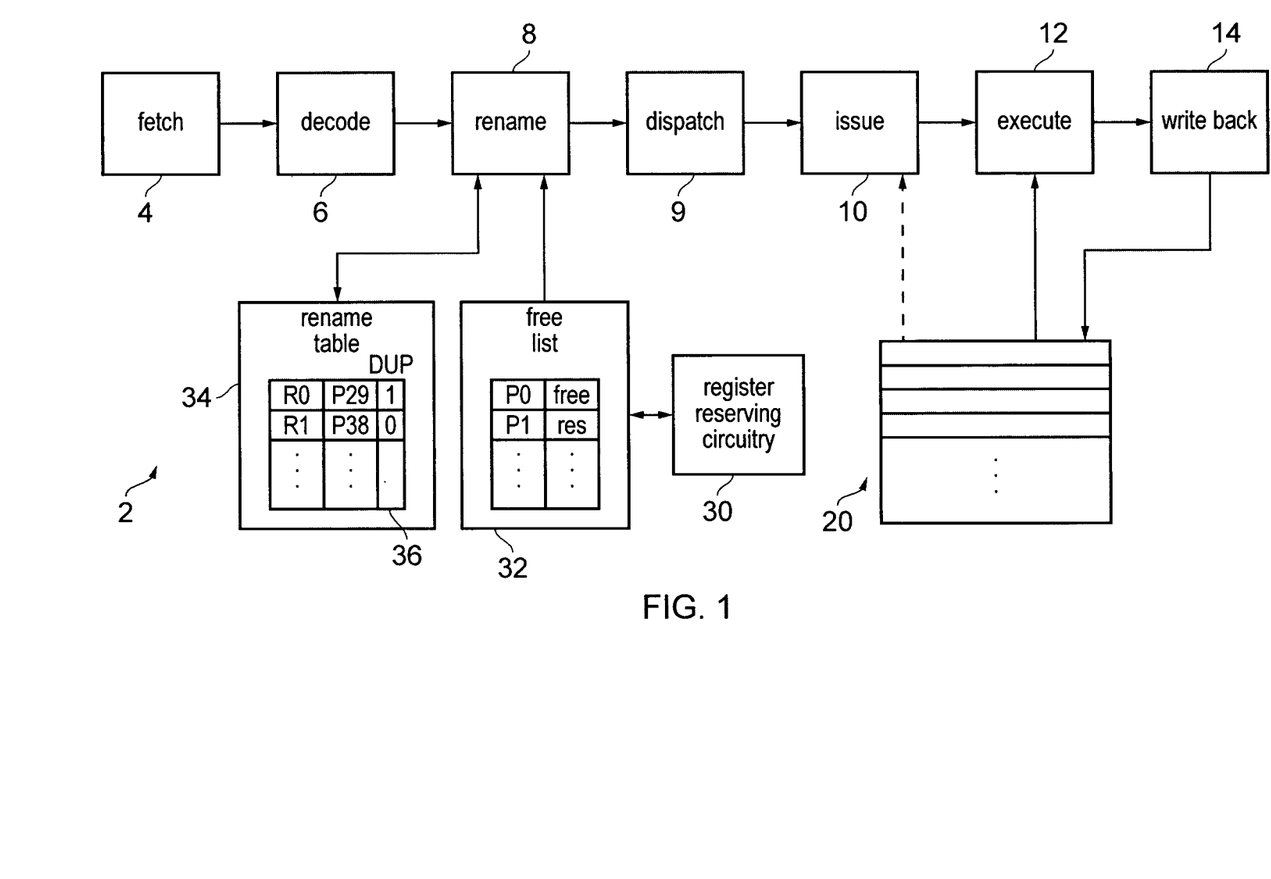
FIG. 1 schematically illustrates an example of a data processing apparatus having register rename circuitry.

FIG. 1 schematically illustrates a portion of a processing pipeline in a data processing apparatus 2. The pipeline includes a number of stages including a fetch stage 4, a decode stage 6, a rename stage 8, a dispatch stage 9, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 9, 10, 12, 14 of the pipeline may be different from the instructions fetched from memory and the term "instruction" should be interpreted as encompassing a micro-operation.

The apparatus 2 has a number of physical registers 20 available for storing data values. A register renaming stage 8 performs register renaming for the decoded instructions (or micro operations) to map logical register specifiers specified by the instructions to physical register specifiers identifying one of the physical registers 20. The instruction set architecture may support a certain number of logical registers (also known as architectural registers) which are visible to the programmer. For example, a 4- or 5-bit register field in the instruction encoding may specify one of 16 or 32 different logical register specifiers. However, to allow hazards between instructions specifying the same logical register specifier to be resolved or to permit out of order or parallel processing of instructions, a greater number of physical registers may be provided, and the register rename stage 8 may map the logical register specifiers in the decoded instructions to corresponding physical registers.

The renamed instructions now specifying physical register specifiers are passed to the dispatch stage 9. The dispatch stage 9 dispatches the instructions to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first. The dispatch stage 9 provides a buffer to enable instructions to leave the rename stage 8 even if the issue queue 10 is full, to allow renaming of other instructions to continue. In other examples, the dispatch stage 9 could be omitted, so that the rename stage 8 effectively also acts as a dispatch stage, but in this case renaming may be stalled when the issue queue 10 becomes full.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions.

When execution of the instruction is complete in the execute stage 12, the instruction is passed to the write back stage 14, which writes a result of the instruction to a physical register 20. In other examples, the register writeback may be viewed as part of the execute stage 12 itself, rather than as a separate pipeline stage.

In the example shown in FIG. 1, for renamed instructions which specify one or more physical registers from which data values are to be read, the reading of the physical register takes place at the execute stage 12. However, other embodiments may read the physical registers 20 while the instruction is pending in the issue queue 10 instead, as shown by the dotted line in FIG. 1. The issue stage 10, execute stage 12 and writeback stage 14 may collectively be viewed as processing circuitry which performs data processing in response to instructions, including reading data from the physical registers 20 and writing data to the registers 20.

Register reserving circuitry 30 is provided for controlling which of the physical registers can be selected by the rename stage 8 for mapping to a logical register. The register reserving circuitry may provide the rename stage 8 with an indication of which physical registers are available for selection or unavailable (reserved). When an instruction which writes to a register is received from the decode stage 6, the rename stage 8 generates a new register mapping for the logical register specified as the destination register for the instruction. The rename stage 8 selects a physical register which is indicated as available by the register reserving circuitry 30 and updates a rename table 32 to include a rename entry mapping the destination logical to the selected physical register.

One type of instruction which may be processed by the pipeline is a move instruction which specifies a source logical register and a destination logical register and is for triggering the pipeline to update the destination logical register to have the same data value as the source logical register. In practice, while execution of instruction gives the impression that a data value is being moved from one register to another, the pipeline need not actually transfer any data values between registers because the same results can be achieved simply by updating the rename table 34 at the rename stage 8.

Figure 2A:
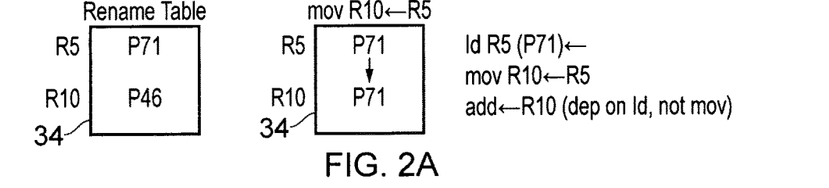
FIG. 2A shows an example of a first move handing technique for handling a move instruction.

For example, in a first move handling technique shown in FIG. 2A, a move instruction may be received specifying a source logical register R5 and a destination logical register R10. R5 may be mapped to a given physical register P71 and R10 may be mapped to a given physical register P46 as shown in the left hand part of FIG. 2. As shown in the right hand part of FIG. 2, by updating the rename table 34 to map the destination logical register R10 to the same physical register P71 that is already mapped to the source logical register R5, subsequent instructions which refer to logical register R10 will access the data value in physical register P71 and so will receive the value previously associated with logical register R5, i.e. the same result as if the data value had actually be transferred between registers in hardware. This approach has several advantages. Firstly, there is no need to actually dispatch the move instruction to any stages beyond the rename stage 8, freeing instruction processing slots at the execute stage 12 for example, which can help speed up the processing of other instructions. Also, if there is a subsequent instruction which depends on the value in logical register R10, such as the add instruction shown in the right hand part of FIG. 2, handling the move at the rename stage 8 means that the add instruction only depends on the previous instruction (e.g. a load) which produces the data in register R5, rather than on the move instruction itself. By allowing consumers of the moves destination register to be dependent on the producer of the move source register rather than on the move instruction itself, performance can be improved. To get an idea of the performance improvement possible, roughly 3% of instructions in the SpecInt2006 benchmark, and roughly 1% in SpecFP2000 benchmark, are moves which can be accelerated using the renaming technique. Handling these moves at rename can result in 1.1% performance improvement in SpecInt2006, 1.4% in SpecFP2000, and 3.6% in the Coremark benchmark.

Figure 2B:
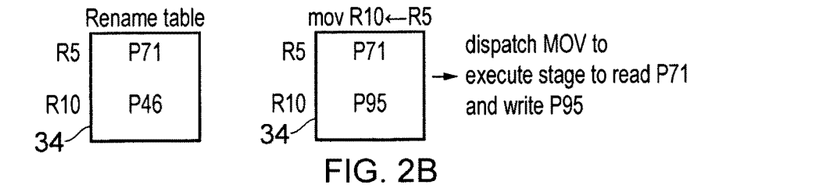
FIG. 2B shows an example of a second move handling technique for handling the move instruction.

As shown in FIG. 2B, the pipeline 2 also supports a second move handling technique in which the move instruction is dispatched and executed at the execute stage 12. In this case, when the move instruction is encountered at the rename stage 8, the rename stage 8 maps the destination logical register R10 of the move instruction to a second physical register (e.g. P95) which is different to a first physical register (e.g. P71) currently mapped to the move source logical register R5. When the move instruction reaches the execute stage 12, the execute stage reads the data value from physical register P71 and the writeback stage 14 writes the data value which was read to the physical register P95 corresponding to the destination logical register R10 of the move instruction.

The rename stage 8 selects between the first move handling technique shown in FIG. 2A and the second move handling technique shown in FIG. 2B. One may think that since the first technique shown in FIG. 2A is faster, one should always choose this technique. However, this can lead to added complexity in the register reserving circuitry 30 since many logical registers may become mapped to the same physical register, which makes it more difficult to determine when the physical register can be reallocated to a different logical register.

The approach discussed in this application takes advantage of the observation that chains of dependent moves, although occurring in a relatively high-end out-of-order processor, are frequently not on the critical path. Most of the moves observed on the critical path do not have a subsequent move that depends on it. For example, if chains of dependent moves are prevented from being accelerated (only the first move in the chain is accelerated using the first move handling technique, and subsequent moves in the chain use the second move handling technique), then in SpecInt2006 roughly 40% of the moves use the second move handling technique, but the performance opportunity lost is only ~0.2% (out of 1.1%). Even more dramatic, in Coremark roughly 50% of the moves use the second move handling technique, but the performance opportunity lost is 0% (out of 3.6%). Additionally, there may be many moves outstanding at a time (up to 8× at a time, for example, is not uncommon), but if so they are typically independent of each other. Limiting to one move handled using the first move handling technique at a time is too prohibitive, so our approach allows for multiple independent moves each to use the first move handling technique simultaneously.

Figure 3:
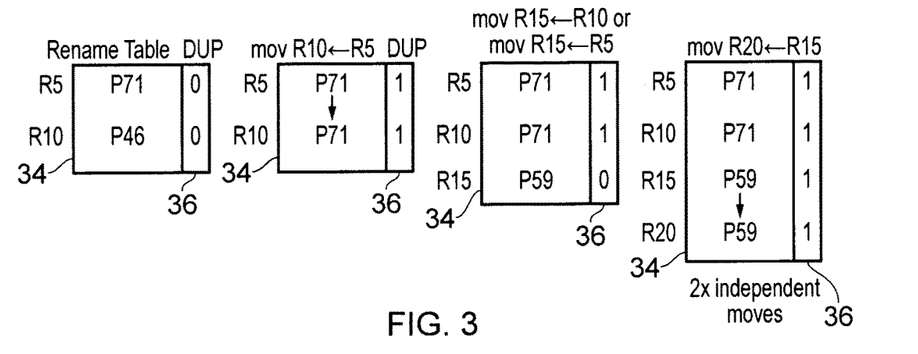
FIG. 3 shows an example of using the first move handing technique for a first move instruction and using a second move handing technique for a subsequent move instruction dependent on the source or destination logical register of the first move instruction.

FIG. 3 illustrates the approach taken by the rename circuitry 8 (acting as control circuitry for controlling which of the first and second move handling techniques are used). As shown in FIG. 1, each entry of the rename table 34 is provided with a control flag 36 (also known as a duplicate flag or a DUP flag) for indicating whether that entry corresponds to a move instruction handled using the first move handling technique. When a first move is encountered at rename-time, both the logical source and destination are marked in the rename table as "duplicate" (or DUP), since they both contain the same physical register. When a physical register corresponding to a committed DUP entry (either the source or destination of the move) is evicted, then the physical register enters an "almost deallocated" (almost available) state. At this point, the physical register then waits on the eviction of the other DUP entry, upon which it may then transition to a "fully deallocated" (available) state, where it may then be reused. If another move is encountered, where the source logical register corresponds to an entry marked as DUP in the rename table, it is not eligible to use the first move handling technique, as this would result in more than two logical registers mapped to a given physical register (which would violate the number of unique state transitions here for a deallocated rename to go through). With this approach, many independent moves may be optimized at once, if they are independent of each other, by marking pairs of logical registers (source and destination of optimized move) as DUP, none of which overlap each other.

Figure 4:
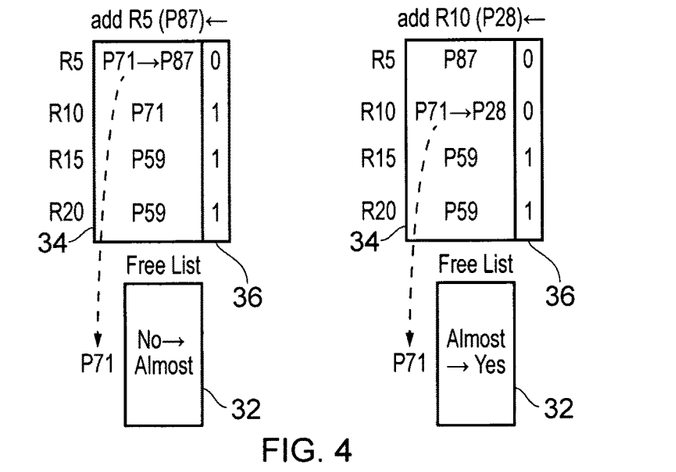
FIG. 4 shows an example of determining when a physical register mapped to two different logical registers following handling of a move instruction according to the first move handing technique can be reallocated to a different logical register.

FIGS. 3 and 4 show an example of this approach for tracking move instruction register mappings and the reallocation of the physical registers. FIG. 3 shows how the rename table 34 is updated as the move instructions are encountered. As shown in the left hand part of FIG. 3, the rename table 34 initially has logical registers R5 and R10 mapped to physical registers P71 and P46 respectively and the DUP flag 36 is 0 for both entries. As shown in the second diagram from the left in FIG. 3, when a first move instruction for moving a data value from logical register R5 to logical register R10 is received, then the rename stage 8 checks the DUP flag 36 associated with the source register R5 and sees that it is 0. Since this register is not marked as duplicate, the move is eligible to be handled using the first move handling technique, and so its destination register R10 is remapped to the same physical register P71 as the source logical register R5, and both the entries for R5 and R10 are marked as DUP.

As shown in the third diagram of FIG. 3, when another move instruction is encountered at the rename stage 8 whose source register is either logical register R5 or logical register R10, the second move handling technique is selected because registers R5 and R10 are marked as DUP. Hence, the destination register R15 of the subsequent move is mapped to a different physical register P59 to the source register R10 or R5 of the move, and the register mapping for logical register R15 is not marked as DUP.

As shown in the right hand diagram of FIG. 3, another move instruction is then received specifying logical registers R15, R20 as source and destination respectively. As the source register R15 is not marked as DUP, this move is free to be optimized using the first move handling technique of FIG. 2A. Therefore, the destination register R20 is mapped to the same physical register P59 as logical register P15, and both logical registers R15 and R20 are marked as DUP. Hence, as shown in FIG. 3, when there are two or more independent move instructions which do not refer to the same logical register, each of these moves can be accelerated by selecting the approach shown in FIG. 2A (since the subsequent independent move would not cause more than two logical registers to be mapped to the same physical register). However, when there is a dependent move then the move is dispatched for execution to avoid needing to track so many logical registers mapped to the same physical register.

FIG. 4 shows an example of controlling which physical registers can be reallocated using the register reserving circuitry after handling moves according to the example of FIG. 3. As shown in the left hand part of FIG. 4, when one of the logical registers R5, R10 which are marked as DUP meets a reallocation condition (e.g. when that renaming entry in the rename table 34 is overwritten), the corresponding physical register P71 transitions from the reserved state ("No") to the almost available state ("Almost"). As shown in the right hand part of FIG. 4, when the other DUP logical register R10 meets the reallocation condition, the free list 32 is updated by the register reserving circuitry 30 to transition physical register P71 from the almost available state to the available state ("Yes"), and at this point the physical register P71 is available for selection again for mapping to a different logical register. In the example of FIG. 4, the reallocation condition is satisfied when the rename table 34 is updated to remap the DUP logical register to a different physical register, but another approach would be to track the actual instructions pending in the pipeline which read physical register P71 and determine that the corresponding logical register meets the reallocation condition when there are no remaining consumers of physical register P71 in the pipeline and a younger instruction which overwrites logical register R5 or R10 is guaranteed to commit.

Figure 5:
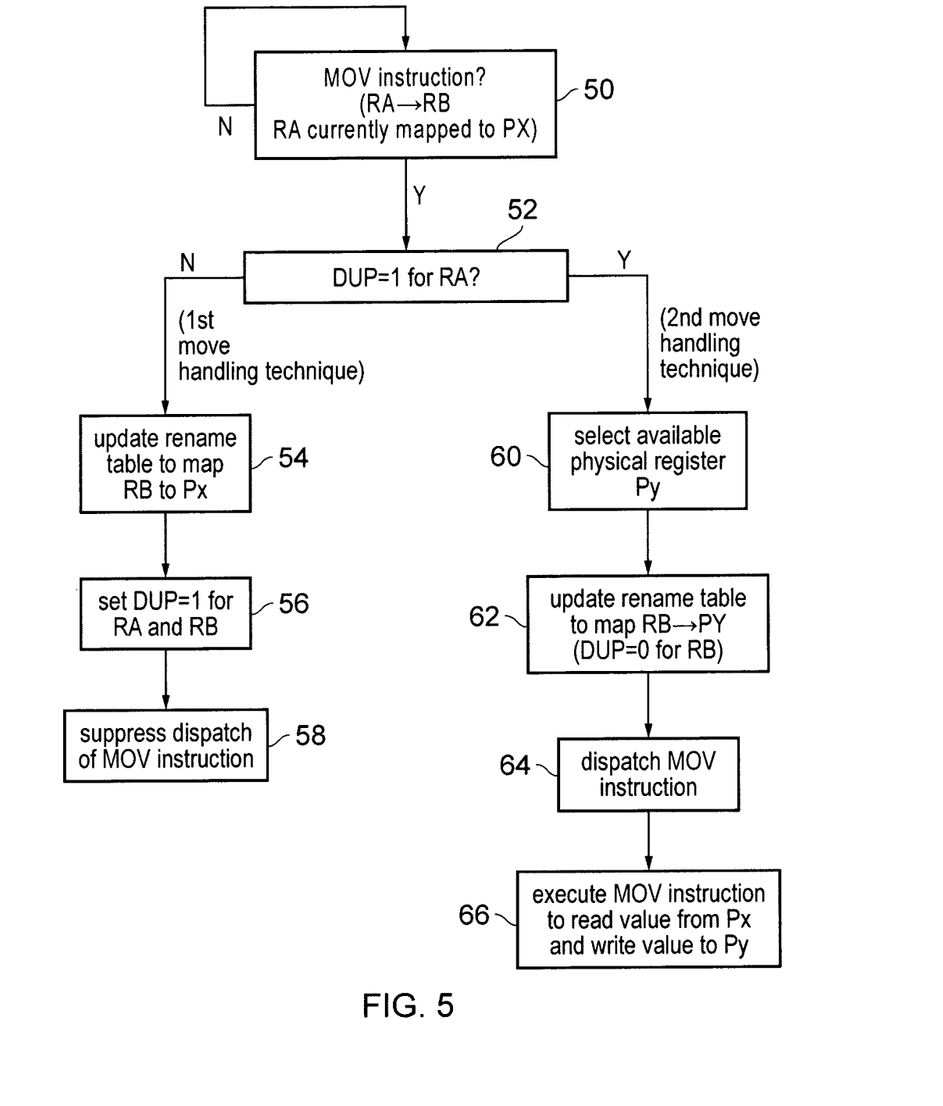
FIG. 5 is a flow diagram showing a method of handling a move instruction.

FIG. 5 shows a method of handling move instructions. At step 50 it is determined at the rename stage 8 whether a move instruction has been encountered (specifying source/destination logical registers RA, RB, for which RA is currently mapped to physical register PX). If the current instruction is not a move instruction then it is handled in some other manner according to conventional techniques. When a move instruction is encountered, then at step 52 the rename stage 8 determines whether the DUP flag 36 is set to 1 for the rename table entry corresponding to source logical register RA. If DUP is 0 for logical register RA then the first move handling technique is selected and at step 54 the rename stage 8 updates the rename table 34 to map the destination logical register RB to the same physical register PX that is already mapped to the source logical register RA. At step 56 the rename stage 8 sets the DUP flag 36 to 1 for both logical registers RA and RB. At step 58 the rename stage 8 suppresses dispatch of the move instruction so that the move instruction does not need to be processed by any subsequent stages of the pipeline. The move instruction is now complete. As discussed above, most move instructions encountered on the critical path of processing are the first move instruction of a chain and are independent of any preceding move instruction and so can use the first move handling technique to be processed faster.

On the other hand, when at step 52 the DUP flag 36 is 1 for logical register RA, the second move handling technique is used and at step 60 the rename stage 8 selects one of the physical registers PY which is indicated by the register reserving circuitry 30 as being in the available state. In some cases, the register reserving circuitry 30 could provide a rename stage 8 with indications of all the physical registers which are available and the rename circuitry 8 could select one of these available physical registers. In other embodiments the register reserving circuitry 30 may select PY itself and may simply provide the rename stage 8 with an indication of which physical register is the selected register PY. Either way, when multiple physical registers are available, any desired selection algorithm or policy could be used to select which register is used as PY. For example, the selection policy could be round robin, least recently used or random.

At step 62 the rename stage 8 updates the rename table 34 to remap the destination logical register RB of the move instruction to the newly selected physical register PY (a different physical register PY to the physical register PX mapped to the source register RA of the move instruction). The rename stage 8 sets the DUP flag 36 to 0 for the rename table entry corresponding to logical register RB, to indicate that this entry does not correspond to a move instruction handed using the first move handling technique. At step 64 the rename stage 8 passes the move instruction to dispatch stage 9 which dispatches the instruction. When the move instruction reaches the execute stage, at step 66 the move instruction is executed to read a data value from physical register PX and the write back stage 14 writes the read data value back to physical register PY.

Figure 6:
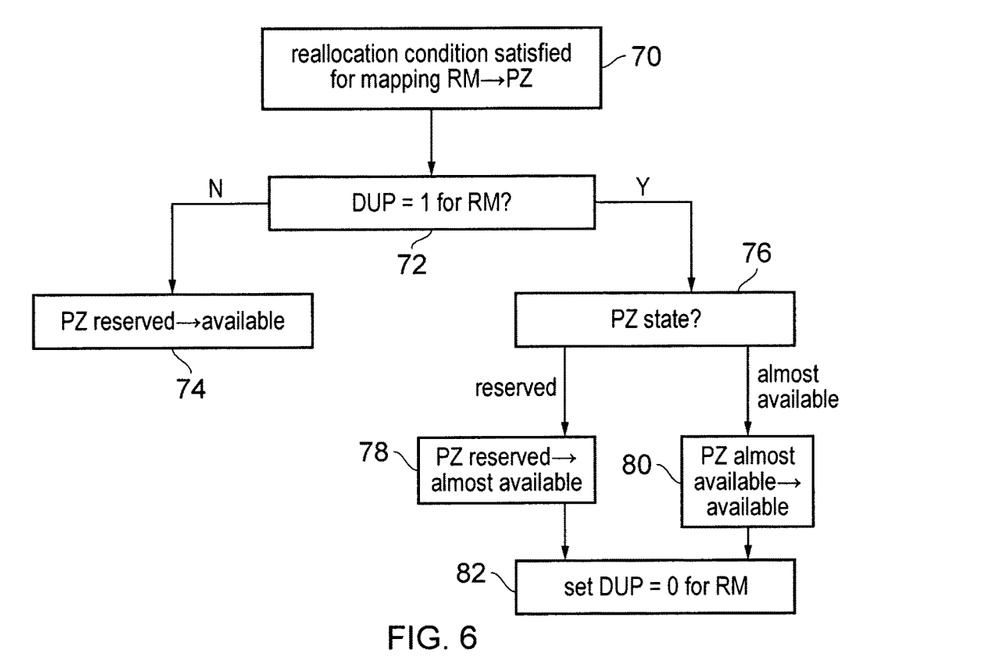
FIG. 6 illustrates a method of determining when a physical register can be reallocated.

FIG. 6 shows a method of controlling which registers are available for reallocation by the register reserving circuitry 30. At step 70 the register reserving circuitry 30 detects that a reallocation condition is satisfied for the mapping between a given logical register RM and a given physical register PZ. For example, the reallocation condition could be satisfied when the rename table entry corresponding to logical register RM is updated by the rename stage 8 in response to a given instruction to specify a different physical register to PZ, and there are no older instructions than the given instruction which are still to be executed (in this context an "older instruction" means an instruction which is earlier in the program order in which the instructions are fetched from memory by the fetch stage 4). Note that the given instruction which triggers remapping of the logical register RM could be a move instruction handled according to the second move handling technique, or another type of instruction which is not a move instruction.

When the reallocation condition is satisfied, at step 72 the register reserving circuitry 30 detects whether the DUP flag is 1. If not, there cannot be another rename table entry pointing to the same physical register, and so at step 74 the physical register PZ transitions from reserved to available in the free list 32. If DUP was 1, then at step 76 the register reserving circuitry 30 checks the free list 32 to determine what state the physical register PZ was in. If physical register PZ is in the reserved state, then this means that there is still another rename table entry pointing to the same physical register, and so the physical register PZ cannot be made available yet, and instead at step 78 physical register PZ transitions from reserved to almost available. If at step 76 it is determined that physical register PZ is already in the almost available state, then this means that the other entry corresponding to the same physical register has already been updated, i.e. this is the last entry pointing to PZ, and so at step 80 the physical register PZ transitions from almost available to available. Following either step 78 or step 80, at step 82 the DUP flag for the logical register RM is set to 0.

Figure 7:
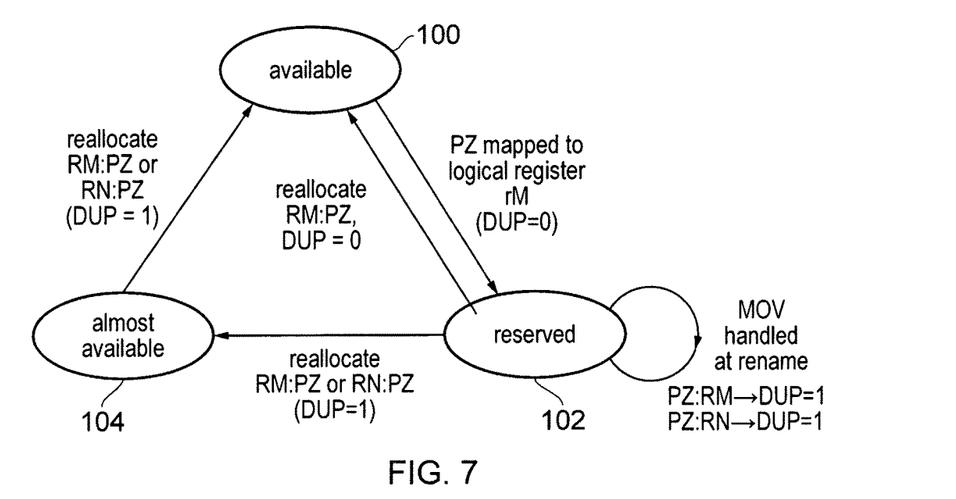
FIG. 7 is a state diagram showing state transitions for a given physical register.

FIG. 7 shows a state diagram summarising the state transitions for a given physical register PZ. PZ transitions from the available state 100 to the reserved state 102 when it is selected for mapping to a given logical register RM (other than when PZ is mapped to the destination of a move handled using the first move handling technique), and at this point the DUP flag for logical register RM is set to 0. PZ transitions from the reserved state 102 to the available state 100 when the mapping from RM to PZ satisfies the reallocation condition and DUP flag for logical register RM is still 0. If while physical register PZ is in the reserved state 102, a move instruction specifying RM as its source register is handled at the rename stage using the first move handling technique, then physical register PZ remains in the reserved state, but the DUP flag for RM is set to 1 (at this point PZ will also become mapped to another logical register RN which is the destination of the move). Physical register PZ transitions from reserved 102 to almost available 104 when one of the mappings RM to PZ or RN to PZ satisfies the reallocation condition and the DUP flag for that mapping is 1. Physical register PZ transitions from almost available 104 to available 100 when the other of mappings RM to PZ or RN to PZ satisfies the reallocation condition and the DUP flag for that mapping is 1.

Figure 8:
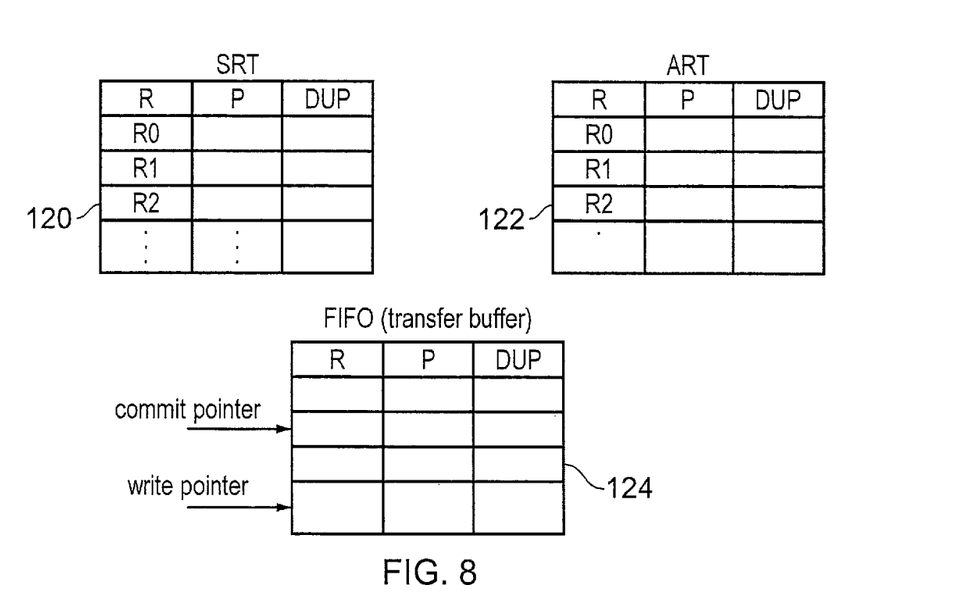
FIG. 8 shows a second embodiment of register rename circuitry using speculative and architectural rename tables.

FIG. 8 shows a more detailed embodiment for the rename table 34, in which the rename table is partitioned into a speculative rename table (SRT) 120 and an architectural rename table (ART) 122. The SRT 120 is speculatively updated at rename-time or dispatch-time (before it is known whether the corresponding instruction should execute), and the ART 122 is updated at commit-time (when enough earlier instructions have been evaluated to guarantee that the committed instruction should execute). Speculative instructions passed down the pipeline use the register mappings from the SRT 120. When destination registers are committed, the logical and physical register pointers (queued in a register FIFO 124) are used to update the ART 122 with the pointers to the newly-architected state. As entries are evicted from the ART 122 by this process, this triggers the deallocation of the evicted physical register by the register reserving circuitry 30. On a flush, the ART 122 is restored to the SRT 120, and any rebuilding of the SRT is performed (if needed) up to the flush point using the register FIFO 124.

For example, the FIFO 124 acts as a circular buffer managed using a write pointer and a commit pointer. When an instruction is renamed, its renaming mapping(s) are pushed to a location of the FIFO indicated by the write pointer. The corresponding instruction may be tagged with the current value of the write pointer as it passes down the rest of the pipeline 2, to allow the correspondence between instructions in the pipeline and entries in the FIFO 124 to be identified. The commit pointer represents the oldest uncommitted instruction. When an instruction is committed which has a tag corresponding to the commit pointer, the commit pointer is updated to correspond to the tag of the next oldest uncommitted instruction, and any FIFO entries which now lie behind the commit pointer are popped from the FIFO and written to the ART 122. If the write pointer or commit pointer reaches one end of the buffer, a following increment to the write or commit pointer moves it to the other end of the buffer, and so as instructions are renamed and committed, the write and commit pointers chase each other round and round the buffer.

Figure 9:
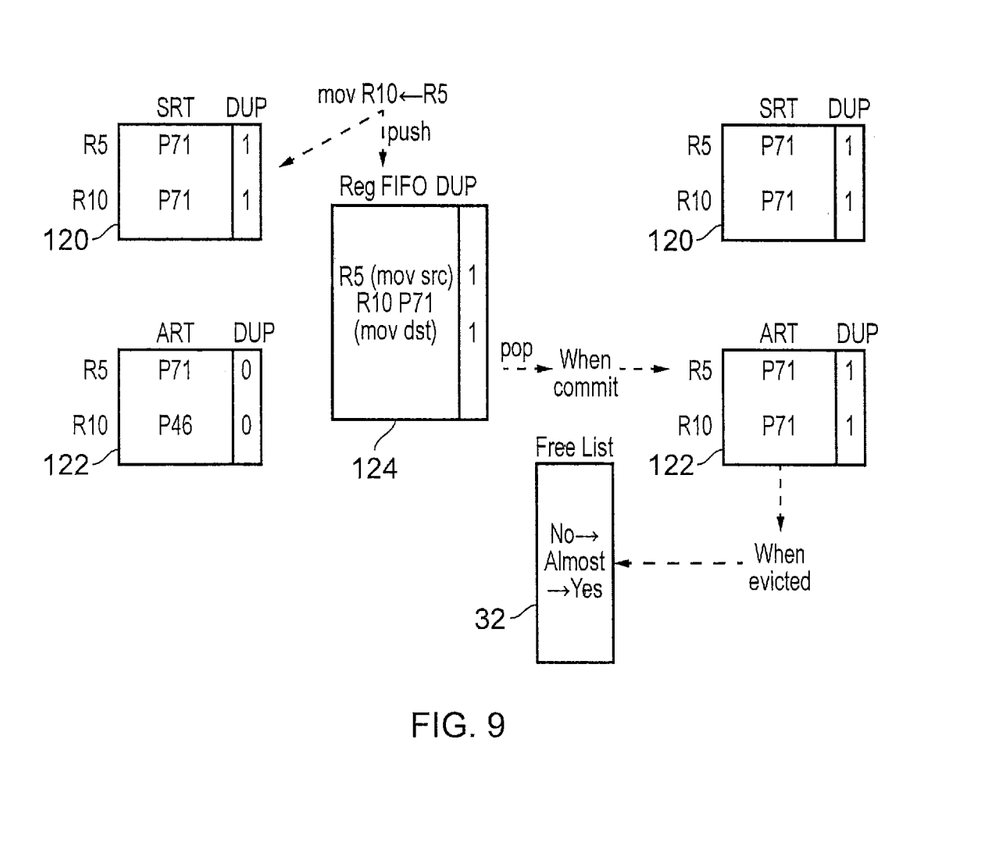
FIG. 9 shows an example of handling move instructions using the embodiment of FIG. 8.

As shown in FIG. 9, when the move handling approach discussed above is applied to an embodiment having separate speculative and architectural rename tables 120, 122, the SRT, ART, and register FIFO (also referred to as a transfer buffer) are updated to have DUP bits for both the move handled using the first move handling technique. Move sources and destinations query the SRT 120 before determining if it can be accelerated using the first move handling technique (it cannot if the source or destination logical register has the DUP bit set in the SRT 120). Two entries are allocated in the register FIFO for an accelerated move (one each for the source and destination, each marked as DUP). When an accelerated move commits, both the source and the destination are marked as DUP in the ART, using the two corresponding entries of the register FIFO. When the first DUP entry is evicted from the ART, the associated physical register is marked as "almost available", and eviction of the second DUP entry for the same physical register causes the final transition to "fully deallocated" (available). On a flush, if an accelerated move needs to rebuild/restore the SRT, the register FIFO is used. Here, both entries corresponding to the optimized move (source and destination) are used to write the SRT entries, along with their DUP bits.

Figure 10:
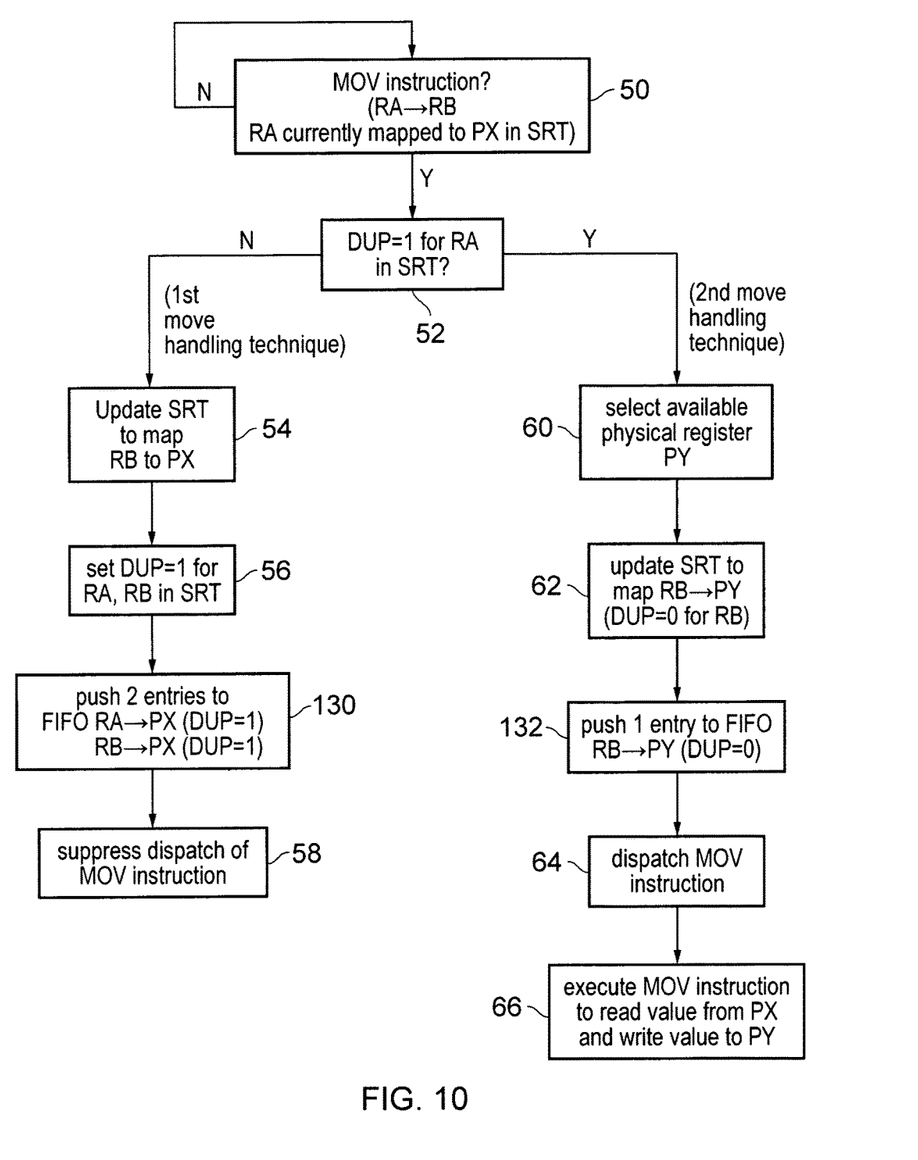
FIG. 10 shows a method of handling move instructions in the second embodiment.

FIG. 10 shows a method of performing register renaming for move instructions in the embodiments having a separate SRT 120 and ART 122. Steps 50 to 66 are the same as the corresponding steps of FIG. 5, except that steps 52, 54, 56 and 62 which relate to checking the DUP flag and updating the rename table are performed using the SRT 120. Also, in the first move handling technique there is an additional step 130 in which two entries are pushed to the FIFO buffer 124, one entry mapping source logical register RA to physical register PX (with the DUP bit set to 1) and the other entry mapping the destination logical register RB to the same physical register PX with DUP flag again set to 1. On the other hand, in the second move handling technique there is an additional step 132 in which a single entry is pushed to the FIFO 124 mapping logical register RB to physical register PY with the DUP bit set to 0. Otherwise the method of FIG. 10 is the same as FIG. 5.

Figure 11:
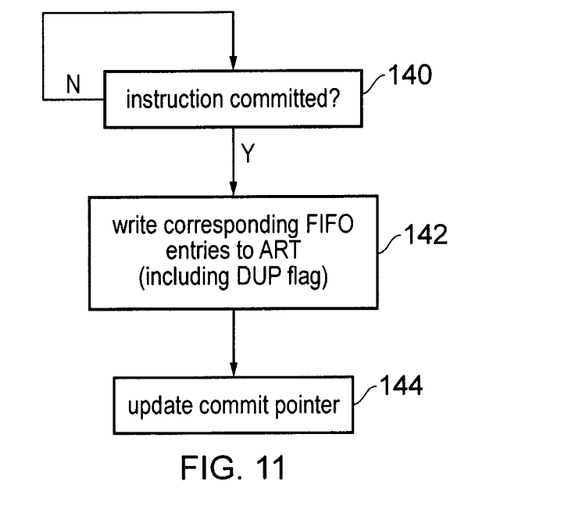
FIG. 11 shows a method of updating the architectural rename table when an instruction is committed.

FIG. 11 shows a method performed by the rename stage when an instruction is committed. In response to an instruction being committed at step 140, at step 142 the corresponding FIFO entries (identified using the committed instruction's tag and the commit pointer of the FIFO 124) are read from the FIFO 124 and written to the locations of the ART corresponding to the logical registers specified by those FIFO entries. The DUP flag of those FIFO entries is also transferred to the ART 122. At step 144, the commit pointer is incremented to point to the FIFO entry associated with the next oldest uncommitted instruction. Note that the FIFO entry associated with this next oldest uncommitted instruction may no longer be specified in the SRT 120 as it could subsequently have been updated in response to a younger instruction. Effectively, the FIFO 124 provides a series of snapshots of the contents of the SRT 120 at different points in time.

Figure 12:
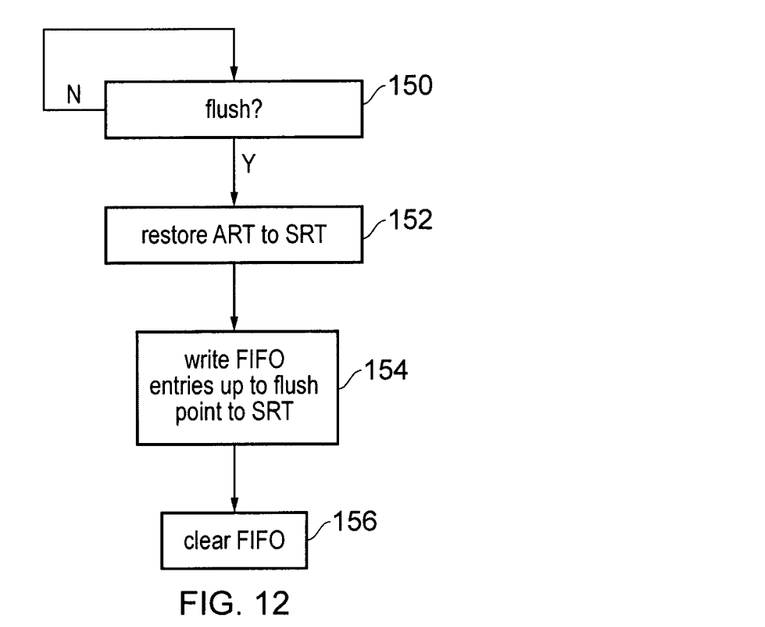
FIG. 12 shows a method of responding to a flush event.

FIG. 12 shows a method of handling a flush event or mis-speculation (e.g. a branch misprediction or data prefetching error). In response to a flush event occurring at step 150, at step 152 all the entries from the ART 122 are restored to the SRT 120. Hence the logical registers are now mapped to physical registers which represent the register state data at the last committed point of execution at which execution was known to be correct. There is no need to transfer state between registers because the old state has been preserved in the larger physical register file and can be accessed simply by updating the SRT based on the ART. At step 154 the SRT 120 is rebuilt by writing to the SRT 120 the FIFO entries from the transfer buffer 124 up to the flush point (e.g. the FIFO entries whose addresses lag the FIFO tag associated with the instruction that caused the flush). At step 156 the FIFO is then cleared.

Figure 13:
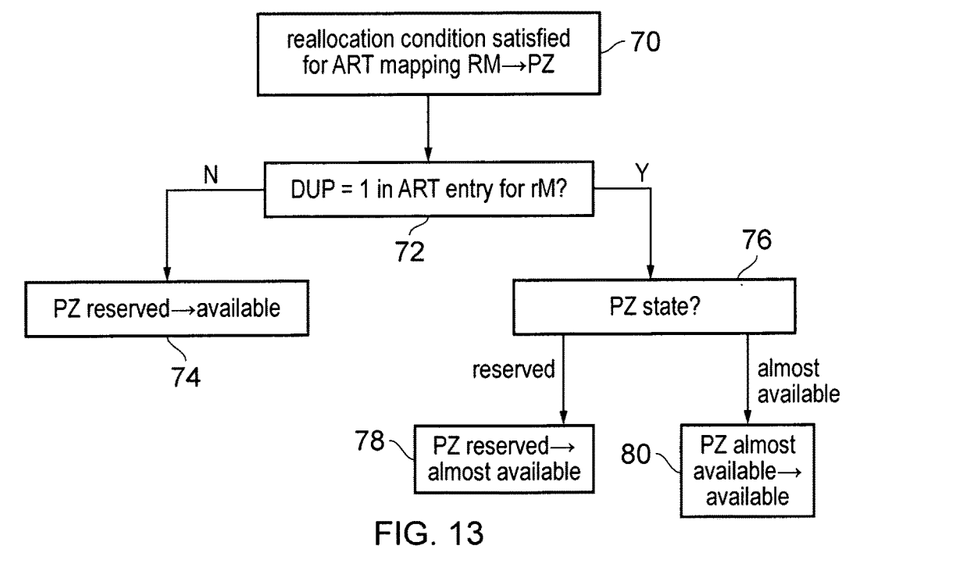
FIG. 13 shows a method of determining when a physical register can be reallocated in the second embodiment.

FIG. 13 shows a method of controlling register reallocation using the register reserving circuitry 30. FIG. 13 is the same as FIG. 6 except that at step 70 the reallocation condition is evaluated based on the ART 122, and similarly at step 72 the relevant DUP flag is the DUP flag of the ART entry corresponding to logical register RM. Also, step 82 of FIG. 6 is omitted in FIG. 13 because the DUP flag may inherently be set to when an ART entry is overwritten with a corresponding FIFO entry from buffer 124 having the DUP flag equal to 0.

Figure 14:
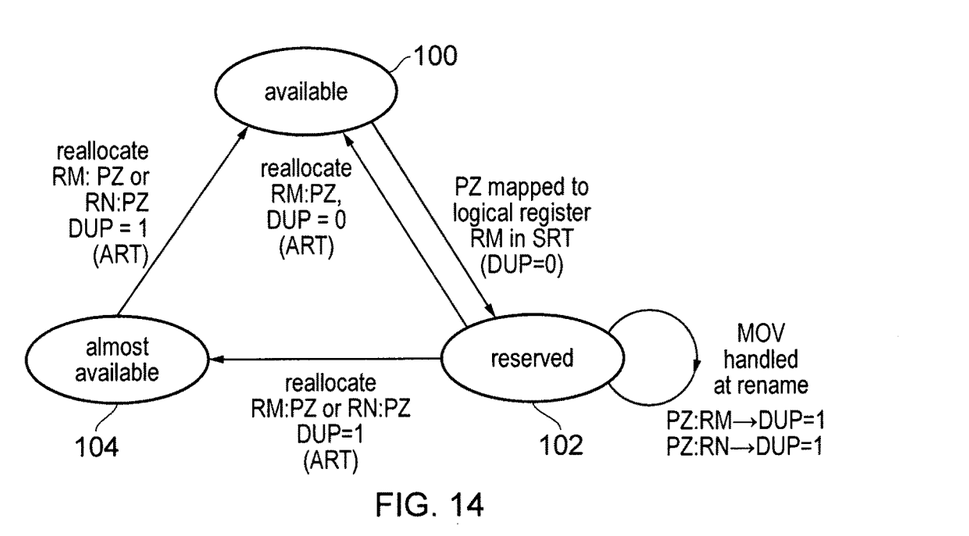
FIG. 14 is a state diagram showing state transitions for a given physical register in the second embodiment.

FIG. 14 shows a corresponding state diagram to that of FIG. 7 for the embodiment using an SRT and ART. FIG. 14 is the same as FIG. 7 except that the transition from available 100 to reserved 102 occurs when there is a remapping in the SRT 120, and the other transitions from reserved 102 to available 100, from reserved 102 to almost available 104 and from almost available 104 to available 100 occur when a reallocation condition is satisfied for a given mapping in the ART 122.

It will be appreciated that the arrangement using an SRT 120, ART 122 and FIFO 124 discussed above is just one example of handling speculative renaming, and other techniques could be used. Also, while the examples discussed above store the DUP flags 36 in the rename table entries themselves, it would be possible to store these separate from the rename table.

To indicate the available, reserved and almost available states, each entry of the free list 32 has at least two bits for indicating the state of the corresponding physical register. In systems which would (in the absence of the present technique) indicate a physical register as either available or reserved, an additional bit per physical register may be required. However, this would be a much smaller overhead than the alternative technique of providing a multi-bit counter and corresponding comparison/control logic per physical register as discussed above. In practice, the free list 32 may already need to indicate other types of register state for each physical register (e.g. if there is another condition in which a physical register needs to be protected from reallocation), and there may be some spare encodings of the register state field which are not already being used. If so, one of the spare encodings could be allocated for indicating the almost available state 104, in which case adding the almost available state would not require an additional bit per physical register in the free list 32.

While the example of FIG. 1 shows the rename stage 8 acting as the control circuitry for determining how to handle a given move instruction, it is also possible to provide separate control circuitry. For example the decode stage 6 could tag move instructions to control how the rename stage 8 handles them.

Another example provides an apparatus comprising:
means for performing data processing in response to instructions;
means for mapping logical registers specified by the instructions to physical registers provided in hardware; and
means for selecting one of a first move handling technique and a second move handling technique for handling a move instruction specifying a source logical register and a destination logical register; wherein:
in the first move handling technique, in response to the move instruction the means for mapping is configured to map the destination logical register to the same physical register as the source logical register;
in the second move handling technique, in response to the move instruction the means for performing data processing is configured to write a data value read from a physical register corresponding to the source logical register to a different physical register corresponding to the destination logical register; and
the means for selecting is configured to select the second move handling technique when the source logical register of the move instruction is the same as one of the source and destination logical registers of an earlier move instruction handled according to the first move handling technique and a current register mapping for said one of the source and destination logical registers is the same as the register mapping used for said one of the source and destination logical registers when handling said earlier move instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to perform data processing in response to instructions;
register rename circuitry to map logical registers specified by the instructions to physical registers provided in hardware;
control circuitry to select one of a first move handling technique and a second move handling technique for handling a move instruction specifying a source logical register and a destination logical register; wherein:
in the first move handling technique, in response to the move instruction the register rename circuitry is configured to map the destination logical register to the same physical register as the source logical register;
in the second move handling technique, in response to the move instruction the processing circuitry is configured to write a data value read from a physical register corresponding to the source logical register to a different physical register corresponding to the destination logical register; and
in response to a chain of move instructions including a first move instruction and at least one dependent move instruction for which the source logical register of the at least one dependent move instruction is the same as one of the source and destination logical registers of an earlier move instruction in the chain:

the control circuitry is configured to select the first move handling technique for the first move instruction of the chain, wherein said first move instruction of the chain comprises a move instruction for which the physical register mapped to the source logical register is different than the physical register mapped to any other logical register; and for each of the at least one dependent move instruction, including a second move instruction of the chain and any subsequent move instruction of the chain, where the second move instruction of the chain is the next move instruction in the chain after the first move instruction, the control circuitry is configured to select the second move handling technique for handling that dependent move instruction when a current register mapping for said one of the source and destination logical registers is the same as the register mapping used for said one of the source and destination logical registers when handling said earlier move instruction.

2. The apparatus according to claim 1, wherein in the second move handling technique, the register rename circuitry is configured to map the destination logical register of the move instruction to a second physical register different from a first physical register currently mapped to the source logical register.

3. The apparatus according to claim 1, comprising a plurality of control flags each corresponding to one of the logical registers;

the control circuitry is configured to select said one of the first move handling technique and the second move handling technique in dependence on the control flag corresponding to the source logical register of the move instruction.

4. The apparatus according to claim 3, wherein when the first move handling technique is selected for handling the move instruction, the control circuitry is configured to set the control flags corresponding to both the source and destination logical registers of the move instruction to a first value.

5. The apparatus according to claim 4, wherein the control circuitry is configured to select the second move handling technique for handling the move instruction when the control flag corresponding to the source logical register of the move instruction has said first value.

6. The apparatus according to claim 4, wherein in response to the register rename circuitry remapping a logical register to a different physical register in response to an instruction other than a move instruction handled according to the first move handling technique, the control circuitry is configured to set the corresponding control flag to a second value.

7. The apparatus according to claim 1, comprising register reserving circuitry to determine, for each register mapping between a logical register and a physical register, whether a reallocation condition for reallocating the physical register to a different logical register is satisfied.

8. The apparatus according to claim 7, wherein following handling of a move instruction according to the first move handling technique, the register reserving circuitry is configured to prevent the physical register mapped to said source and destination logical registers of the move instruction becoming available to be reallocated until the reallocation condition is satisfied for both a register mapping corresponding to said source logical register and a register mapping corresponding to said destination logical register.

9. The apparatus according to claim 7, wherein the register reserving circuitry is configured to maintain register state information for each physical register, the register state information indicating one of a plurality of register states for the corresponding physical register, said plurality of register states including at least an available state, a reserved state, and an almost available state.

10. The apparatus according to claim 9, wherein when remapping a given logical register to a new physical register, the register rename circuitry is configured to map the given logical register to a selected physical register for which the corresponding register state information indicates the available state, and the register reserving circuitry is configured to update the corresponding register state information for the selected physical register to indicate the reserved state.

11. The apparatus according to claim 9, wherein following handling of a move instruction according to the first move handling technique for which the source and destination logical registers are mapped to a given physical register:

in response to detecting that the reallocation condition is satisfied for the register mapping between one of the source and destination logical registers and the given physical register, when said register state information for the given physical register indicates the reserved state, the register reserving circuitry is configured to update the register state information for the given physical register to indicate the almost available state.

12. The apparatus according to claim 9, wherein following handling of a move instruction according to the first move handling technique for which the source and destination logical registers are mapped to a given physical register:

in response to detecting that the reallocation condition is satisfied for the register mapping between one of the source and destination logical registers and the given physical register, when said register state information for the given physical register indicates the almost available state, the register reserving circuitry is configured to update the register state information for the given physical register to indicate the available state.

13. The apparatus according to claim 1, comprising:

a speculative rename table to identify register mappings updated in response to speculatively renamed instructions; and an architectural rename table to identify register mappings updated in response to committed instructions.

14. The apparatus according to claim 13, wherein the control circuitry is configured to select the second move handling technique when the source logical register of the move instruction is the same as said one of the source and destination logical registers of said earlier move instruction handled according to the first move handling technique and a current register mapping specified by the speculative rename table for said one of the source and destination logical registers is the same as the register mapping used for said one of the source and destination logical registers when handling said earlier move instruction.

15. The apparatus according to claim 13, comprising register reserving circuitry to control which physical registers are available to be reallocated to a different logical register by the register rename circuitry;

wherein following handling of a move instruction according to the first move handling technique, the register reserving circuitry is configured to prevent the physical register mapped to said source and destination logical registers of the move instruction becoming available to be reallocated until register mappings for both the source and destination registers of the move instruction have been overwritten in the architectural rename table.

16. The apparatus according to claim 13, comprising a transfer buffer to store one or more register mapping entries specifying register mappings updated in the speculative rename table which are still to be updated in the architectural rename table when corresponding instructions are committed.

17. The apparatus according to claim 16, wherein each entry of the speculative rename table, the transfer buffer and the architectural rename table has a corresponding control flag indicative of whether the corresponding register mapping corresponds to one of the source and destination logical registers of a move instruction handled according to the first move handling technique.

18. The apparatus according to claim 1, wherein said control circuitry comprises said register rename circuitry.

19. An apparatus comprising:
   means for performing data processing in response to instructions;
   means for mapping logical registers specified by the instructions to physical registers provided in hardware; and
   means for selecting one of a first move handling technique and a second move handling technique for handling a move instruction specifying a source logical register and a destination logical register; wherein:
   in the first move handling technique, in response to the move instruction the means for mapping is configured to map the destination logical register to the same physical register as the source logical register;
   in the second move handling technique, in response to the move instruction the means for performing data processing is configured to write a data value read from a physical register corresponding to the source logical register to a different physical register corresponding to the destination logical register; and
   in response to a chain of move instructions including a first move instruction and at least one dependent move instruction for which the source logical register of the at least one dependent move instruction is the same as one of the source and destination logical registers of an earlier move instruction in the chain:
      the means for selecting is configured to select the first move handling technique for the first move instruction of the chain, wherein said first move instruction of the chain comprises a move instruction for which the physical register mapped to the source logical register is different than the physical register mapped to any other logical register; and
      for each of the at least one dependent move instruction, including a second move instruction of the chain and any subsequent move instruction of the chain, where the second move instruction of the chain is the next move instruction in the chain after the first move instruction, the means for selecting is configured to select the second move handling technique for handling that dependent move instruction when a current register mapping for said one of the source and destination logical registers is the same as the register mapping used for said one of the source and destination logical registers when handling said earlier move instruction.

20. A data processing method comprising:
   selecting one of a first move handling technique and a second move handling technique for handling a move instruction specifying a source logical register and a destination logical register;
   when the first move handling technique is selected, mapping the destination logical register to the same physical register as the source logical register; and
   when the second move handling technique is selected, reading a data value from a physical register corresponding to the source logical register and writing the data value to a different physical register corresponding to the destination logical register;
   in response to a chain of move instructions including a first move instruction and at least one dependent move instruction for which the source logical register of the at least one dependent move instruction is the same as one of the source and destination logical registers of an earlier move instruction in the chain:
      selecting the first move handling technique for the first move instruction of the chain, wherein said first move instruction of the chain comprises a move instruction for which the physical register mapped to the source logical register is different than the physical register mapped to any other logical register; and
      for each of the at least one dependent move instruction, including a second move instruction of the chain and any subsequent move instruction of the chain, where the second move instruction of the chain is the next move instruction in the chain after the first move instruction, selecting the second move handling technique for handling that dependent move instruction when a current register mapping for said one of the source and destination logical registers is the same as the register mapping used for said one of the source and destination logical registers when handling said earlier move instruction.

* * * * *